United States Patent [19]
Whatcott

[11] Patent Number: 5,308,397
[45] Date of Patent: May 3, 1994

[54] BASE COAT STUCCO MORTARS FOR COATING AND FINISHING INTERIOR AND EXTERIOR WALLS OF A BUILDING

[76] Inventor: Burton K. Whatcott, P.O. Box 863, Dolores, Colo. 81323

[21] Appl. No.: 18,164

[22] Filed: Feb. 16, 1993

[51] Int. Cl.$^5$ .................. C04B 14/38; C04B 14/42; C04B 7/02
[52] U.S. Cl. .................... 106/711; 106/708; 106/709; 106/724; 106/737; 106/738
[58] Field of Search .............. 106/709, 711, 737, 738, 106/708, 724

[56] References Cited

U.S. PATENT DOCUMENTS

| | | | |
|---|---|---|---|
| 1,138,069 | 5/1915 | Applegate | 52/445 |
| 4,054,691 | 10/1977 | McMillan | 427/322 |
| 4,067,164 | 1/1978 | McMillan | 52/309 |
| 4,240,952 | 12/1980 | Hulbert, Jr. et al. | 106/709 |
| 4,741,777 | 5/1988 | Williams et al. | 106/709 |
| 4,767,461 | 8/1988 | Tamura et al. | 106/737 |
| 5,108,679 | 4/1992 | Rirsch et al. | 106/711 |

FOREIGN PATENT DOCUMENTS

| | | | |
|---|---|---|---|
| 2916335 | 11/1979 | Fed. Rep. of Germany | 106/709 |
| 336307 | 4/1972 | U.S.S.R. | 106/737 |
| 621652 | 8/1978 | U.S.S.R. | 106/737 |
| 1057461 | 11/1983 | U.S.S.R. | 106/709 |

Primary Examiner—Helene Klemanski
Assistant Examiner—Anthony J. Green
Attorney, Agent, or Firm—Warren F. B. Lindsley

[57] ABSTRACT

A stucco coating for interior and exterior walls of buildings that provides increased bonding strength over the prior art.

7 Claims, No Drawings

BASE COAT STUCCO MORTARS FOR COATING AND FINISHING INTERIOR AND EXTERIOR WALLS OF A BUILDING

BACKGROUND OF THE INVENTION

This invention relates to stucco and more particularly to base coating materials for coating and finishing the interior and exterior walls of buildings.

For hundreds of years, very few changes have taken place in the formulation and application techniques of stucco. Traditionally, base coat stucco over frame construction is applied ⅞" thick in two separate coats. In order to achieve strength in this system, each coat must be laboriously water cured. In order to achieve good workability in conventional stucco, normal base coat stucco mixes are designed with a high water demand which decreases the tensile and flexural strength of the mortar resulting in shrinkage, cracking during the drying process, and structural cracking due to its inability to withstand structural movement of the building it is applied on. Due to the high suction of conventional cementitious stucco mortar, thinly applied finish coats dry up quickly making it difficult to achieve consistently uniform finishes. The high suction also makes the stucco mortar susceptible to water penetration and staining.

DESCRIPTION OF THE PRIOR ART

U.S. Pat. No. 1,138,069 discloses a stucco like siding for building purposes comprising a substitute for the usual stucco finishes. The siding comprises a series of composite sheets each composed of a base of waterproof fabric, a pitchy waterproof coating thereon and a granular coating applied to the pitchy coating.

U.S. Pat. No. 4,054,691 discloses a process for promoting the adhesion of cementitious material to closed cell generally smooth skinned foam material.

U.S. Pat. No. 4,067,164 discloses composite panels for building purposes.

None of the known prior art disclose the improved lightweight, self curing, shrinkage controlled cementitious coatings set forth herein for interior and exterior wall surfaces.

SUMMARY OF THE INVENTION

In accordance with the invention claimed, a greatly improved base coat stucco formulation is disclosed which may be applied in a single coat over any solid, lath reinforced substrate such as foam, plywood, gyp board, etc. The bond strength is so great that it becomes monolithic to the surface it is applied to. No water curing is required for this stucco mortar to achieve tensile, flexural and compressive strengths that are many times greater than that of conventional stucco mortars. These improved stucco base coat mortars have a tough elasticity that resists stucco cracking in all but extreme situations. It is highly water resistant and its low suction allows stucco finishes to be applied easier resulting in consistently uniform finishes. This formulation has a very low water/cement ratio with excellent workability.

It is, therefore, one object of this invention to provide new and improved mortars for coating interior and exterior walls of buildings.

Another object of this invention is to provide an improved stucco finishing material which will adhere more reliably to the surface of fiberboard and foam sheathing due to its light weight and improved flexibility and bonding characteristics.

A further object of this invention is to provide improved moisture resistant stucco coatings that employ fiberglass and latex polymers to insure flexibility and thereby eliminate or greatly reduce cracking of the cementitious material with time.

Further objects and advantages of the invention will become apparent as the following description proceeds and the features of novelty which characterize this invention will be pointed out with particularity in the claims annexed to and forming a part of this specification.

DESCRIPTION OF THE PREFERRED EMBODIMENT

The disclosed invention relates to base coat mortars for covering interior and exterior walls and ceilings of buildings and structures. The improved base coat mortars disclosed exhibit greatly enhanced bond, flexural, tensile and compressive strength as well as much greater resistance to abrasion, cracking and moisture than conventional stucco mortars.

Compared to conventional ⅞" thick mortars requiring two application base coats, the improved mortars disclosed herein are applied in a single application ⅜" thick which reduces half of the application labor as well as ½ the stucco weight that must be supported by the structure being stuccoed. The improved stucco mortars bond tenaciously to the substrate they are applied to and require no water curing to reach their high strengths, unlike conventional stucco mortars that depend wholly on laborious water curing to develop strengths that do not compare to the strengths and crack resistance of the improved claimed stucco mortars. Finish coats may be applied as soon as the improved base coat mortar has dried thus eliminating the costly curing time between coats that are necessary for conventional stucco base coats. Because of the low suction of the improved base coat stucco, finishes are easier to apply and are more uniform in texture and color.

The following describes the ingredients set forth below and the approximate weights and percentages in which they may be effectively used.

Cement—Any class of white or grey Portland cement.

Lime—Any type dehydrated lime ranging from 0% to 50% by weight of cement and pozzolan.

Pozzolan—Natural Pozzolan—Type C fly ash or Type F Fly Ash ranging from 0% to 100% of cement by weight.

Clay—Any type ranging from 0% to 20% by weight of the cement.

Micro Silica—Ranging from 0% to 50% by weight of the cement.

Reinforcing Fibers—Any type of natural or synthetic fiber ranging from 1/32" to 3" in length. Amount of fiber can range from 0% to 20% by weight of total cement, pozzolan and lime.

Polymers—Can be any type of wet or powder form. Polymers or Copolymers, Acrylic, Styrene Acrylic, Styrene Butadiene, P.V.A. or combination of two or more of the above ranging from 0% to 25% solids by weight of total cement, pozzolan and lime.

Defoamer—Any liquid or powder defoamer added at a rate from 0% to 15% by weight of the cement.

Waterproofing Additive—Any type ranging from 0% to 10% by weight of lime, cement or pozzolan ingredients.

Dispersant/Surfactant—Any type ranging from 0% to 5% by weight of the dry solids.

Preservative—Fungicides ranging from 0% to 5% by weight of the total mix.

Air Entraining Admixture—Any type used in amount to create from 0% to 30% air entraining in the wet mixture.

Water Reducing Admixture—Any type used to create from 0% to 25% reduction in water used.

Accelerator—Any type ranging from 0% to 5% by weight of the combined cement, lime and pozzolan ingredients.

Aggregate—Any type of natural or synthetic aggregate added in the range from 1:1½ cement/aggregate to 1:6 cement/aggregate by volume.

Colorant—As required for desired color.

Water as required.

The invention is best illustrated by the following examples. The titles of these examples are merely given by way of illustration and are not intended to restrict the scope of the invention or the manner in which it can be practiced. Throughout the examples and the specification, unless specifically provided otherwise, parts and percentages of the various mortars are given as approximate parts and percentages by weight.

Further, Portland cement may range from 1:1 cement to sand by volume to 1:5 cement to sand by volume.

| HAND APPLIED BASE COAT | |
|---|---|
| 90.00 lbs. Portland Cement | Type I or II |
| 10.00 lbs. Hydrated Lime | (3 lbs. clay or 2 ounces of air entraining plasticizer can be substituted for the lime) |
| 2.00 lbs. Reinforcing Fibers | Fiberglass or Monofilament |
| 8.00 lbs. Polymer Solids | Styrene Butadiene Rubber |
| 3:1 Sand/Cement by volume | ASTM graded stucco sand |
| Water | As needed |

| EXTRA HIGH STRENGTH BASE COAT | |
|---|---|
| 90.00 lbs. Portland Cement | Type I or II |
| 10.00 lbs. Micro Silica | |
| 2.00 lbs. Reinforcing Fiber | Fiberglass or Monofilament |
| 2.00 oz. Super Plasticizer | Gibco PRF |
| 15.00 lbs. Polymer Solids | Styrene Butadiene Rubber |
| 2:1 Sand/Cement by Volume | ASTM Graded Stucco Sand |
| .50 lbs. Dispersant | Tamol SN |
| Water | As needed |

| QUICK SETTING BASE COAT | |
|---|---|
| 95.00 lbs. Portland Cement | High Early Cement |
| 5.00 lbs. Aluminite Cement | |
| 4.00 lbs. Clay | Bentonite |
| 2.00 lbs. Reinforcing Fibers | Fiberglass and Monofilament |
| 10.00 lbs. Polymer Solids | Styrene Butadiene Rubber |
| 3:1 Sand/Cement by Volume | ASTM Graded Stucco Sand |
| Water | As Needed |

| WATERPROOF BASE COAT | |
|---|---|
| 80.00 lbs. Portland Cement | Type I or II |
| 20.00 lbs. Pozzolan | Type F Fly Ash |
| 3.00 lbs. Waterproofing Agent | Calcium Stearate |
| 2.00 lbs. Reinforcing Fibers | Fiberglass or Monofilament |
| 20.00 lbs. Polymer Solids | Styrene Butadiene Rubber |
| .25 lbs. Cellulose | Hydroxypropyl Cellulose |
| 2:1 Sand/Cement by Volume | ASTM Graded Stucco Sand |
| Water | As Needed |

| PUMP APPLIED BASE COAT | |
|---|---|
| 100.00 lbs. Portland Cement | Type I or II |
| 10.00 lbs. Hydrated Lime | (3 lbs. clay or 2 ounces of air entraining plasticizer can be substituted for the lime. |
| 15.00 lbs. Pozzolan | Type F Fly Ash |
| 10.00 lbs. Polymer Solids | Styrene Butadiene Rubber |
| 2.00 lbs. Reinforcing Fibers | Fiberglass or Monofilament |
| 3:1 Sand/Cement by Volume | ASTM Graded Stucco Sand |
| Water | As Needed |

| LIGHTWEIGHT BASE COAT (NAILABLE) | |
|---|---|
| 80.00 lbs. Portland Cement | Type I or II |
| 20.00 lbs. Pozzolan | Type F Fly Ash |
| 4.00 lbs. Clay | Bentonite |
| 4.00 oz. Air Entraining Super Plasticizer | Gibco PRF |
| 2.00 lbs. Reinforcing Fibers | Fiberglass or Monofilament |
| 10.00 lbs. Polymer Solids | Styrene Butadiene Rubber |
| 2.50 C.F. Lightweight Filler | Pumice, Perlite, Vermiculite, Foam Beads, etc. |
| Water | As Needed |

It should be noted that the following may be added to any of the above coating and still fall within the scope of this invention.

1. Defoamer may be added to control air entrainment.
2. Preservatives may be added to the liquid portion of the formulas to control fungus during shelf time of liquid admix.
3. Accelerator may be used if desired.
4. Cement colorants may be used if desired.
5. Retarders may be used to increase setting time of the formula.
6. Waterproofing additives may be added if necessary.

Further, in the examples above set forth, the latex polymers may range up to 25 percent solids by weight of the cement, pozzolan or lime. The defoamer may range up to 5 percent by weight of the cement. The waterproofing additive may range up to 5 percent by weight of the lime, cement or pozzolan. The water reducing admixture may range up to 10 percent by weight of the cement.

The key to this invention is the utilization of polymers, reinforcing fibers and mix design with greatly reduced water to cement ratios that eliminate the high shrinkage found in conventional stucco mixes.

These formulas are produced in two separate systems:

System 1—Concentrate: In this system, all the ingredients except the aggregates and water are prepackaged and shipped to the job site where the sand and water are added. This system may utilize a liquid polymer latex or a dry polymer depending on the mix design.

System 2—Sanded Base: In this system, all the ingredients including the aggregates are prepackaged and shipped to the job site where only water is added. This system also may utilize a liquid polymer latex or a dry polymer depending on the mix design.

Although but a few embodiments have been illustrated and described, it will be apparent to those skilled in the art that various changes and modifications may be made therein without departing from the spirit of the invention or from the scope of the appended claims.

What is claimed is:

1. A refractory combination for a base coating for mortars comprising in combination:
   approximately 90 pounds of Portland cement,
   approximately 10 pounds of hydrated lime,
   approximately 2 pounds of reinforcing fibers,
   approximately 8 pounds of polymer solids,
   approximately 3 parts of sand to 1 part of cement by volume,
   water as needed to provide a fluid workable combination, wherein
   said reinforcing fibers comprise fiberglass, and
   said polymer solids comprise styrene butadiene rubber.

2. A refractory combination for a high strength base coat for mortars comprising:
   approximately 90.00 pounds of Portland cement,
   approximately 10.00 pounds micro silica,
   approximately 2.00 pounds reinforcing fiber,
   approximately 2.00 ounces super plasticizer,
   approximately 15.00 pounds polymer solids,
   approximately 2:1 ratio of sand to cement by volume,
   approximately 0.50 pounds dispersant, and
   water as needed to obtain a fluid combination, wherein
   said polymer solids comprise styrene butadiene rubber.

3. A refractory combination for a quick setting base coat comprising:
   approximately 95.00 pounds Portland cement,
   approximately 5.00 pounds aluminite cement,
   approximately 4.00 pounds clay,
   approximately 2.00 pounds reinforcing fibers,
   approximately 10.00 pounds polymer solids,
   approximately 3:1 ratio of sand to cement by volume, and
   water as needed to obtain a fluid combination, wherein
   said polymer solids comprise styrene butadiene rubber.

4. A refractory combination for a waterproof base coating for mortars comprising:
   approximately 80.0 pounds Portland cement,
   approximately 20.00 pounds of pozzolan,
   approximately 2.00 pounds reinforcing fibers,
   approximately 20.00 pounds polymer solids,
   approximately 0.25 pounds cellulose,
   approximately 2:1 ratio of sand to cement by volume,
   water as needed to obtain a fluid combination, and
   approximately 3.00 pounds waterproofing agent, wherein
   said polymer solids comprise styrene butadiene rubber.

5. A refractory combination for a pump applied base coating for mortars comprising:
   approximately 100.00 pounds Portland cement,
   approximately 10.00 pounds hydrated lime,
   approximately 15.00 pounds pozzolan,
   approximately 10.00 pounds polymer solids,
   approximately 2.00 pounds reinforcing fibers,
   approximately 3:1 ratio of said to cement by volume, and
   water as needed to obtain a fluid combination, wherein
   said polymer solids comprise styrene butadiene rubber.

6. A refractory combination for a lightweight nailable base coating for mortars comprising:
   approximately 80.00 pounds Portland cement,
   approximately 20.00 pounds pozzolan,
   approximately 4.00 pounds clay,
   approximately 4.00 ounces air entraining super plasticizer,
   approximately 2.00 pounds reinforcing fibers,
   approximately 10.00 pounds polymer solids,
   approximately 2.50 ft$^3$ lightweight filler, and
   water as needed to obtain a fluid combination, wherein
   said polymer solids comprise styrene butadiene rubber.

7. A refractory combination for a base coating for mortars comprising in combination:
   approximately 90 pounds of Portland cement,
   approximately 10 pounds of hydrated lime,
   approximately 2 pounds of reinforcing fibers,
   approximately 8 pounds of polymer solids, and
   approximately 3 parts of sand to 1 part of cement by volume, wherein p1 said polymer solids comprise styrene butadiene rubber.

* * * * *

UNITED STATES PATENT AND TRADEMARK OFFICE
CERTIFICATE OF CORRECTION

PATENT NO. : 5,308,397
DATED : May 3, 1994
INVENTOR(S) : Burton K. Whatcott

It is certified that error appears in the above-identified patent and that said Letters Patent are hereby corrected as shown below:

Claim 7, line 8 cancel "pl".

Signed and Sealed this

Twenty-third Day of August, 1994

Attest:

BRUCE LEHMAN

Attesting Officer      Commissioner of Patents and Trademarks